(No Model.)
G. RICHARDSON.
DEVICE FOR TAPPING MAINS.
No. 266,052. Patented Oct. 17, 1882.
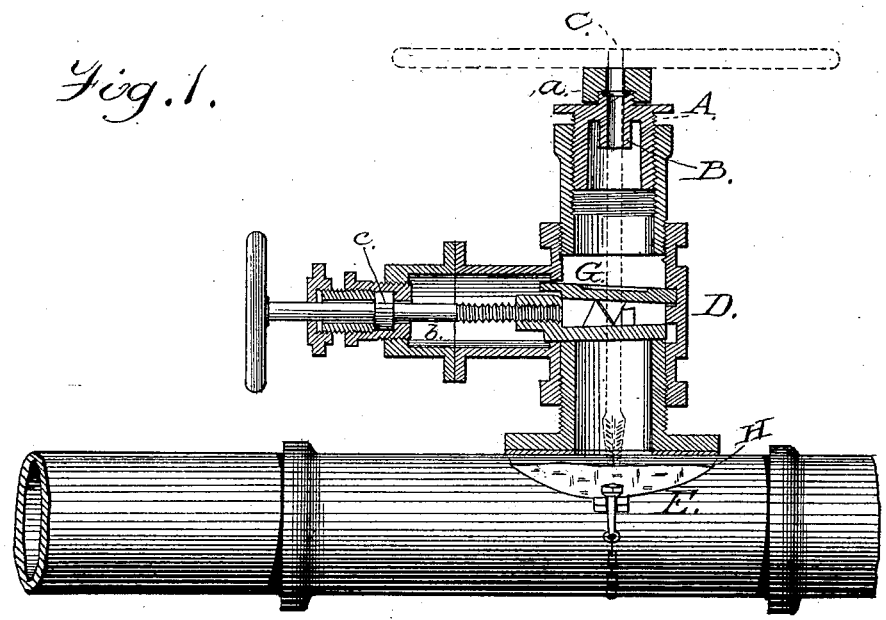
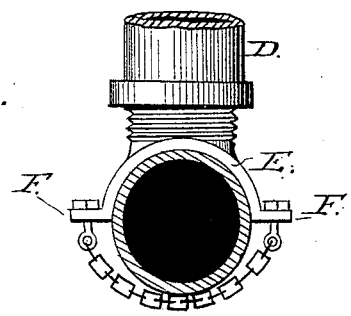
Witnesses,
Walter Fowler
W. J. Haviland
Inventor;
George Richardson
By Atty.
P. W. Smith

UNITED STATES PATENT OFFICE.

GEORGE RICHARDSON, OF BRIDGEPORT, CONNECTICUT.

DEVICE FOR TAPPING MAINS.

SPECIFICATION forming part of Letters Patent No. 266,652, dated October 17, 1882.

Application filed April 8, 1882. (No model.)

*To all whom it may concern:*

Be it known that I, GEORGE RICHARDSON, a citizen of the United States, residing at Bridgeport, in the county of Fairfield and State of Connecticut, have invented certain new and useful Improvements in Devices for Tapping Mains, of which the following is a specification, reference being had therein to the accompanying drawings.

My invention relates to devices for tapping water, gas, or steam mains while there is a full head of water, gas, or steam therein, and has for its object to provide a tapping-machine whose simplicity of construction shall afford great strength and facility of use, which is the main and desirable feature in machines of this description; and with these ends in view my invention consists of a cylinder or box provided at its upper end with a screw-cap extended at its lower or interior surface, and provided with a central vertical opening to act as a guide, and at the bottom with a flange having finger-projections, in combination with a valve having a stationary stem and drill or plug and proper clamping mechanism.

It consists, further, in providing a nut on top of the cap and encircling the drill, all of which will be hereinafter fully and in detail explained.

In order that those skilled may understand more fully the construction and operation of my improved main-tapping machine, I will proceed to describe the same in detail, referring by letters to the accompanying drawings, in which—

Figure 1 is a central vertical section of my improvement with the valve open and the drill in position for operation, and Fig. 2 a detail view of the flange portion affixed to a main-pipe.

A is the screw-cap, provided with the channel or guide B, through which the drill C is inserted.

*a* is the nut, which is passed over the drill and is screwed onto the upper projection of the cap A.

D is the cylinder or box, having at its lower end a flange, E, provided with finger-like projections F. This flange is of such contour on its under surface as to readily conform to the curvature of the pipe or main.

G is a valve plate or disk, which is cast or formed with a cylindrical neck having a female screw-thread made axially through it, into and through which the male-threaded stem *b* works. This stem is operated by a wheel or similar device, as shown, and is provided with collars *c c* to prevent any horizontal motion of said stem, the object and effect being economy of space in operating the valve-stem.

The mode of application and operation of my improved main-tap is as follows: I first place a packing-disk, H, perforated at the center, on the pipe, and then place thereon the cylinder D in such manner that the flange E fits firmly over said disk. A chain is then passed underneath said pipe and provided at its extremities with threaded bolts, which are inserted within the finger-like projections, and by means of screw-nuts on said threaded bolts I clamp the cylinder firmly to the pipe. I then unscrew the cap A and introduce the drill C within the channel or guide B at its lower end, and then screw down the cap. I preferably operate the drill at the start by means of a ratchet-wrench, the necessary pressure on said drill being brought to bear thereon in any well-known manner. It will be readily understood that the guide B prevents the drill from wabbling or being unsteady, so that there is always a true alignment between said guide and the hole drilled in the main, thus greatly facilitating the insertion of the plug. After the main has been tapped and the drill withdrawn I close the valve, which is readily done, since no extra space is required in the operation of the stem of said valve, as previously explained. I then unscrew the guide-cap and introduce the rod with plug attached. Having screwed down the cap and opened the valve, I screw the plug into the hole drilled, and the whole operation is then completed. This is obviated by placing a rubber packing-ring upon the upper projection of the cap A, said projection being beveled for facility, and then screwing down the nut *a*, which strikes against said ring, thereby causing it to spread and bind against the drill.

The great objection to devices for tapping mains is the fact that their complicated nature detracts greatly from their strength and durability, and nearly, if not quite all, of such devices are practically useless.

I am aware of the Patent No. 216,379, granted to Chapman and Hawthorne, June 10, 1879, also of the Patent No. 174,542, granted to A. Letzkus, March 7, 1876, but do not wish to be understood as laying claim to any such construction; nor do I wish to be understood as claiming the broad idea of a machine for tapping mains in combination with a valve, since I am aware that it is not new so to do; but What I do claim as new, and desire to secure by Letters Patent, is—

The combination, with the cylinder or valve-chamber, of the hollow screw-cap A, having the drill-guide B, projecting both above and below the top plate, and the nut a, fitted on the screw-threaded upper projection of said guide, substantially as set forth.

In testimony whereof I affix my signature in presence of two witnesses.

GEO. RICHARDSON.

Witnesses:
 JOSEPH A. JOYCE,
 W. T. HAVILAND.